(12) United States Patent
Krueger et al.

(10) Patent No.: US 7,434,631 B2
(45) Date of Patent: Oct. 14, 2008

(54) APPARATUS AND METHOD OF CONTROLLING MOTION AND VIBRATION OF AN NMR SENSOR IN A DRILLING BHA

(75) Inventors: Volker Krueger, Celle (DE); Thomas Kruspe, Wienhausen (DE); Hans-Juergen Faber, Neustadt (DE); Johannes Witte, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/682,590

(22) Filed: Mar. 6, 2007

(65) Prior Publication Data

US 2007/0144782 A1 Jun. 28, 2007

Related U.S. Application Data

(63) Continuation of application No. 10/796,256, filed on Mar. 9, 2004, now Pat. No. 7,185,715.

(60) Provisional application No. 60/453,438, filed on Mar. 10, 2003.

(51) Int. Cl.
E21B 47/01 (2006.01)

(52) U.S. Cl. ............... 175/40; 175/50; 166/66.5

(58) Field of Classification Search ............ 175/40, 175/26, 50; 166/66.5

See application file for complete search history.

(56) References Cited

U.S. PATENT DOCUMENTS

| | | | | | |
|---|---|---|---|---|---|
| 4,011,918 | A | * | 3/1977 | Jurgens | 175/325.2 |
| 5,358,059 | A | * | 10/1994 | Ho | 175/45 |
| 5,705,927 | A | * | 1/1998 | Sezginer et al. | 324/303 |
| 6,179,066 | B1 | * | 1/2001 | Nasr et al. | 175/45 |
| 6,230,557 | B1 | * | 5/2001 | Ciglenec et al. | 73/152.01 |
| 6,459,263 | B2 | * | 10/2002 | Hawkes et al. | 324/303 |
| 6,637,524 | B2 | * | 10/2003 | Kruspe et al. | 175/40 |
| 6,739,409 | B2 | * | 5/2004 | Kruspe et al. | 175/50 |
| 2002/0153136 | A1 | * | 10/2002 | Kruspe et al. | 166/250.01 |
| 2003/0146022 | A1 | * | 8/2003 | Krueger | 175/61 |

* cited by examiner

Primary Examiner—William P Neuder
(74) Attorney, Agent, or Firm—Madan, Mossman and Sriram

(57) ABSTRACT

A system for controlling sensor motion during a time-dependent measurement, comprising a drilling assembly having a drill bit at one end and engaged with a drill string extending to a surface location at an opposite end thereof. A sensor is disposed in the drilling assembly for making a measurement of a formation parameter of interest. A non-rotating stabilizer is disposed in the drilling assembly proximate the sensor. The non-rotating stabilizer is adapted to reduce motion of the sensor below a predetermined level during the measurement. In one embodiment the rotational axis of the stabilizer is eccentric with respect to the borehole. In another embodiment, the non-rotating stabilizer has an extendable rib for changing the effective diameter of the stabilizer.

20 Claims, 4 Drawing Sheets

APPARATUS AND METHOD OF CONTROLLING MOTION AND VIBRATION OF AN NMR SENSOR IN A DRILLING BHA

CROSS REFERENCE TO RELATED APPLICATIONS

This application is a continuation of U.S. patent application Ser. No. 10/796,256 filed Mar. 9, 2004, which claims priority from and the benefit of U.S. Provisional Application Ser. No. 60/453,438, filed Mar. 10, 2003.

BACKGROUND OF THE INVENTION

1. Field of the Invention

This invention relates generally to determining geological properties of subsurface formations using MWD/LWD sensors, and particularly for improving the accuracy of signals from such sensors by restricting the tool motion during the measurements.

2. Description of the Related Art

A variety of techniques are utilized in determining the presence and estimation of quantities of hydrocarbons (oil and gas) in earth formations. These methods are designed to determine formation parameters, including among other things, the resistivity, porosity and permeability of the rock formation surrounding the wellbore drilled for recovering the hydrocarbons. Typically, the tools designed to provide the desired information are used to log the wellbore. Much of the logging is done after the well bores have been drilled. More recently, wellbores have been logged while drilling, which is referred to as measurement-while-drilling (MWD) or logging-while-drilling (LWD).

The various sensors utilized in the MWD/LWD environment are subjected to substantial motion and vibration that can compromise the quality of the resulting measurements. The MWD/LWD sensor sensitivity to motion can be roughly grouped in three categories: (i) sensors that are not significantly affected such as temperature sensors; (ii) sensors that can not tolerate substantially any motion such as formation pressure sampling systems; and (iii)sensors that produce degraded measurements such as, for example, Nuclear Magnetic Resonance (NMR) systems and other nuclear lithology sensors known in the art.

Nuclear Magnetic Resonance logging tools and methods are used for determining, among other things, porosity, hydrocarbon saturation and permeability of the rock formations. The NMR logging tools are utilized to excite the nuclei of the liquids in the geological formations surrounding the wellbore so that certain parameters such as nuclear spin density, longitudinal relaxation time (generally referred to in the art as $T_1$) and transverse relaxation time (generally referred to as $T_2$) of the geological formations can be measured. From such measurements, porosity, permeability and hydrocarbon saturation are determined, which provides valuable information about the make-up of the geological formations and the amount of extractable hydrocarbons.

The NMR tools generate a uniform or near uniform static magnetic field in a region of interest surrounding the wellbore. NMR is based on the fact that the nuclei of many elements have angular momentum (spin) and a magnetic moment. The nuclei have a characteristic Larmor resonant frequency related to the magnitude of the magnetic field in their locality. Over time the nuclear spins align themselves along an externally applied static magnetic field creating a net magnetization. This equilibrium situation can be disturbed by a pulse of an oscillating magnetic field, which tips the spins with resonant frequency within the bandwidth of the oscillating magnetic field away from the static field direction. After tipping, the spins precess around the static field at a particular frequency. At the same time, the magnetization returns to the equilibrium direction (i.e., aligned with the static field) according to a decay time known as the "spin-lattice relaxation time" or $T_1$. For hydrogen nuclei a static field of 235 Gauss would produce a precession frequency of 1 MHz. T1 is controlled totally by the molecular environment and is typically ten to one thousand ms. in rocks.

Tool motion can seriously affect the performance of NMR tools used in an MWD/LWD environment because the measurement is not instantaneous and requires a non-varying magnetic field during the measurement time. NMR tools that have static magnetic fields and that have complete rotational symmetry are unaffected by rotation of the tool since the fields in the region of examination do not change during the measurement sequence. However, any radial or vertical component of tool motion will affect the NMR signal. As discussed in U.S. Pat. No. 5,705,927 issued to Kleinberg, resonance regions of many prior art instruments are of the order of 1 mm. Accordingly, a lateral vibration at a frequency of 50 Hz having an amplitude of 1 mm (100 g acceleration) would disable the instrument. The Kleinberg '927 patent discloses making the duration of each measuring sequence small, e.g. 10 ms, so that the drill collar cannot be displaced by a significant fraction of the vertical or radial extent of the sensitive region during a measurement cycle. However, using such short measurement times only gives an indication of the bound fluid volume and gives no indication of the total fluid volume.

There are numerous patents discussing the vibration of a rotating shaft subject to mechanical forces of the kind encountered by a drill string. U.S. Pat. No. 5,358,059 issued to Ho discloses the use of multiple sensors, including accelerometers, magnetometers, strain gauges and distance measuring sensors for determining the conditions of a drillstring in a borehole in the earth. The motion of the drill string in the borehole includes rotational motion, transverse (or radial) motion, and a whirl of the drill string. Whirling of the drillstring is the eccentric motion of the axis of the drillstring around the axis of the borehole and is a motion of great concern in NMR measurements. In an NMR tool, this motion causes the magnetic field strength in the region of examination to change with time, thereby degrading the measurement signal. Both whirl and various vibrational bending modes can cause radial motion that degrades the measurement.

The methods and apparatus of the present invention overcome the foregoing disadvantages of the prior art by providing a system for limiting the motion of the drill string in the region of measurement.

SUMMARY OF THE INVENTION

The present invention contemplates a system for controlling sensor motion during a measurement comprising a drilling assembly in a wellbore, where the drilling assembly has a drill bit at one end and is engaged with a drilling tubular at an opposite end thereof. A first sensor is disposed in the drilling assembly for making a measurement of a formation parameter of interest. A substantially non-rotating stabilizer is disposed in the drilling assembly proximate the first sensor. The substantially non-rotating stabilizer is adapted to reduce motion of the first sensor below a predetermined level during the measurement.

In another aspect, a method for controlling sensor motion during a measurement, comprises extending a drilling tubular in a wellbore to a downhole location. The drilling tubular is engaged with a drilling assembly having a drill bit at a bottom end thereof. A first sensor disposed in the drilling assembly is used for making a measurement of a formation parameter of interest. A non-rotating stabilizer is attached in the drilling assembly proximate the first sensor. The non-rotating stabilizer is adapted to reduce motion of the first sensor below a predetermined level during the measurement.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
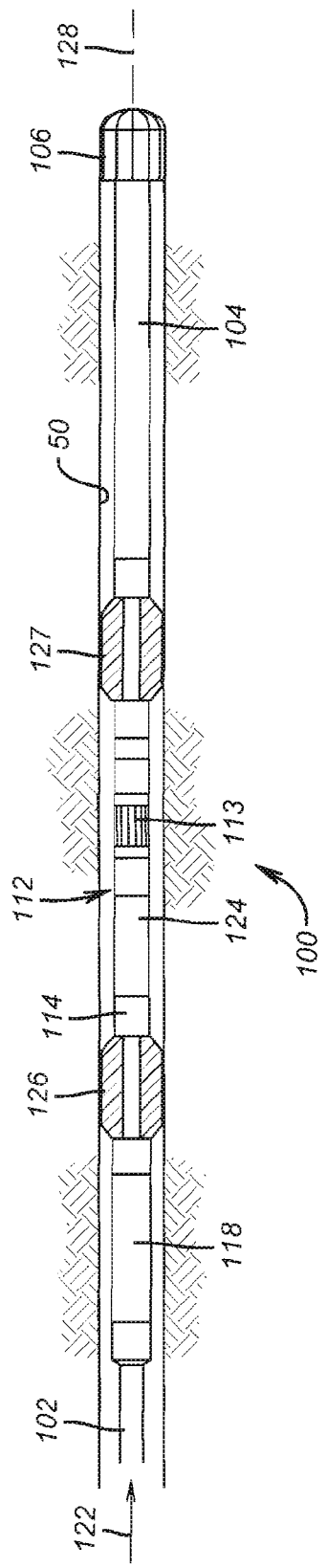
FIG. 1 is a schematic drawing of a drilling assembly according to one embodiment of the present invention.

Referring to FIG. 1, an exemplary drilling assembly 100 at the end of a drilling tubular such as, for example, drill string 102 or, alternatively, coiled tubing (not shown) is illustrated in a borehole 50. A measurement-while-drilling (MWD) tool 104, an associated pulsed nuclear magnetic resonance (NMR) tool 112 with NMR sensor 113 electronic circuitry 124, and a pulsed power unit 118 are connected in tandem in the drilling assembly 100. The MWD tool 104 may also have other sensors (not shown) including, but not limited to, a sonic sensor, a density measurement tool, and a porosity measurement tool. A communication sub (not shown) using, for example, two-way telemetry, is also provided in the drilling assembly 100. The drilling assembly is also provided with a plurality of motion sensors (not shown) for sensing the motion of the tool within the borehole. In one embodiment of the invention, the motion sensors are accelerometers that sense the three components of acceleration of the tool.

The drilling assembly 100 also includes a drill bit 106. The drill string 102 includes, for example, sections of drill pipe connected end-to-end or a generally continuous coiled tubing. The drill bit 106 may be rotated by rotating the drill string 102. Alternatively, a downhole motor (not shown) may be included in the drill string 102 and/or the drilling assembly 100 for rotating the drill bit 106. The borehole 50 typically contains a drilling fluid 122, also called "mud", which is forced through the drill string 102 and the bottom hole drilling assembly 100 through the drill bit 106. The drilling fluid acts to lubricate the drill bit 106 and to carry borehole cutting or chips away from the drill bit 106.

The communication sub and power unit 118, MWD tool 104, and NMR tool 112 with sensor 113 are all connected in tandem with the drill string 102. Such subs and tools form a bottom hole drilling assembly 100 between the drill string 102 and the drill bit 106. Non-rotating stabilizers 126, 127 are used to stabilize and center the drilling assembly 100 and create a vibrational node within the borehole. The housing 114, for example, a drilling collar, is made of a nonmagnetic alloy. The drilling assembly 100 makes various measurements including pulsed nuclear magnetic resonance measurements while the borehole is being drilled. The NMR tool is rotationally symmetric about a longitudinal axis 128 of the drilling assembly 100. For a more detailed description of an exemplary NMR tool, see U.S. Pat. No. 6,459,263 B2 to Hawkes et al., assigned to the assignee of this application, and incorporated herein by reference.

Figure 2:
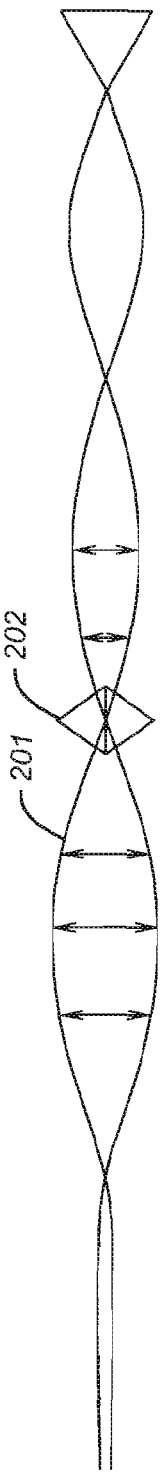
FIG. 2 is a schematic drawing of the vibrational motion of a drill string according to one embodiment of the present invention.

The motion of the drill string 102 and the bottom hole drilling assembly 100, without the presence of a stabilizer, can include the superposition of eccentric whirl and various modes of lateral (also called radial) vibrational movement. The resulting lateral motion may result in a excessive lateral displacement and velocity close to the NMR sensor resulting in a substantially degraded NMR signal. The addition of a stabilizer near the sensor position acts to centralize the drilling assembly 100 and to substantially act as a vibrational node, restricting the allowable lateral movement and velocity of the drilling assembly at that location. This effect can be seen in FIG. 2 which shows the analytically predicted vibrational motion 201 of the drilling assembly and the motion at node 202 indicating the effect of the stabilizer near the sensor.

Figure 3A:
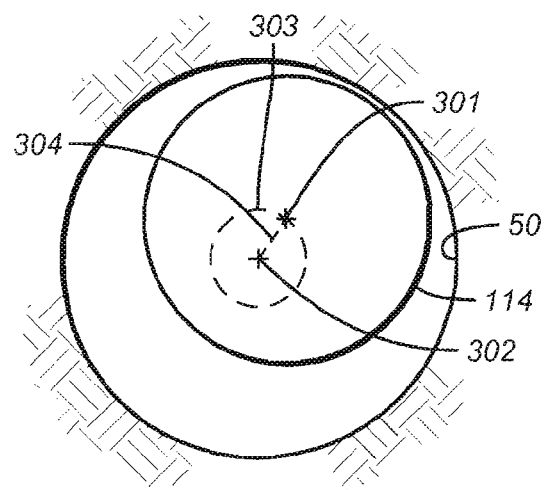
FIG. 3A is a schematic drawing depicting the whirling motion of a drill string in a borehole according to one embodiment of the present invention.
Figure 3B:
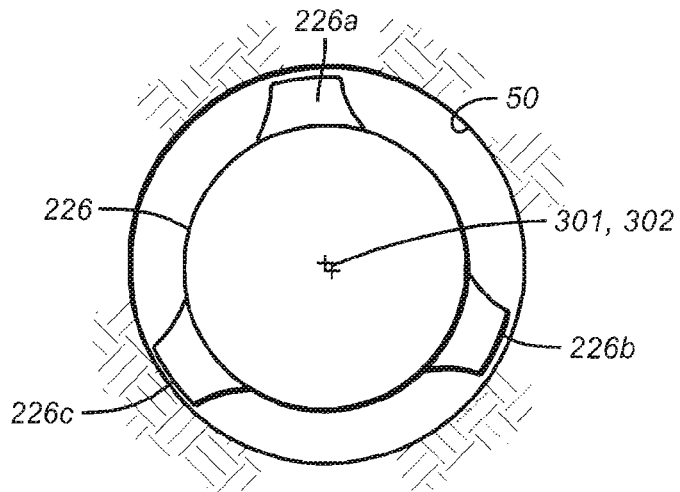
FIGS. 3B, 3C are schematic drawings depicting the effects of a rotating stabilizer on the whirling motion of a drill string in a borehole according to one embodiment of the present invention.
Figure 3C:
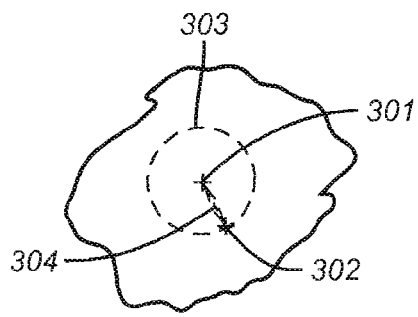

The use of a fixed diameter, rotating stabilizer, common in the art, has several drawbacks in this application. A fixed diameter, rotating stabilizer has to have an outside diameter substantially smaller (3-4 mm) than the nominal borehole diameter. The common tendency is for the borehole to become slightly oversize resulting in a lateral motion caused by vibration and/or whirl of even more than the nominal 3-4 mm clearance. Analysis of NMR measurements indicate that motion amplitudes greater than about 1-2 mm result in strongly degraded results using such sensors. FIG. 3A shows an end view of the whirl of the sensor housing 114 in the borehole 50. The center 301 of the sensor housing 114 moves along the path 303, with radius 304, around the center 302 of the borehole 50 degrading sensor measurements. Radius 304 is substantially greater than the allowable motion for acceptable measurements. The addition of fixed diameter, rotating stabilizer 226, with centralizer ribs 226a-c, near the sensor housing 114 reduces the whirl of the sensor housing 114 but not enough to provide acceptable measurements because of the difference in diameters discussed above, see FIGS. 3B-3C. The interaction of the rotating centralizer ribs with the wall of the borehole can result in a tendency for the centralizer to crawl around the internal diameter of the borehole 50. In addition, the additional mass of the rotating stabilizer, moving eccentrically around the center 302 of borehole 50 act as unbalanced rotating masses that tend to excite additional vibration modes.

Figure 4A:
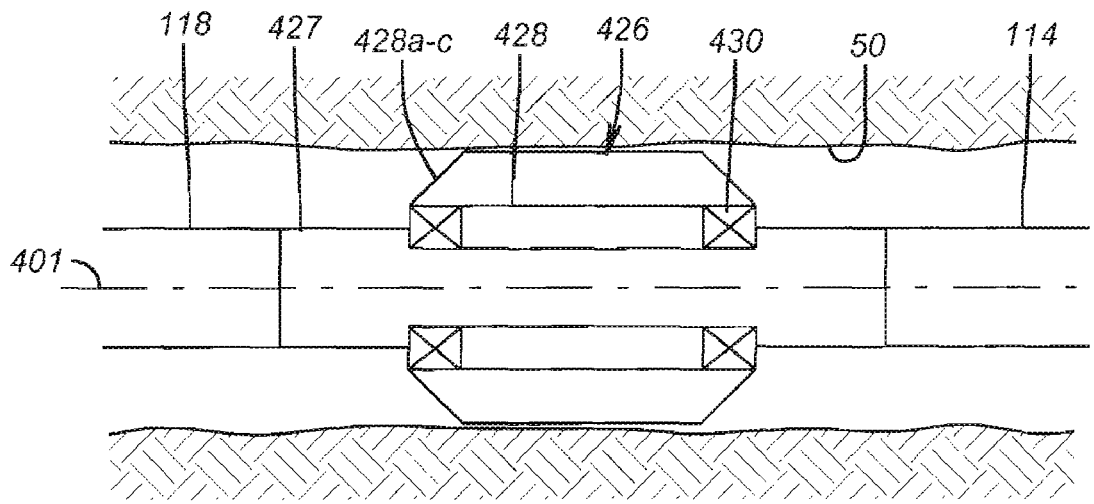
FIG. 4A is a schematic drawing of a non-rotating stabilizer according to one embodiment of the present invention.
Figure 4B:
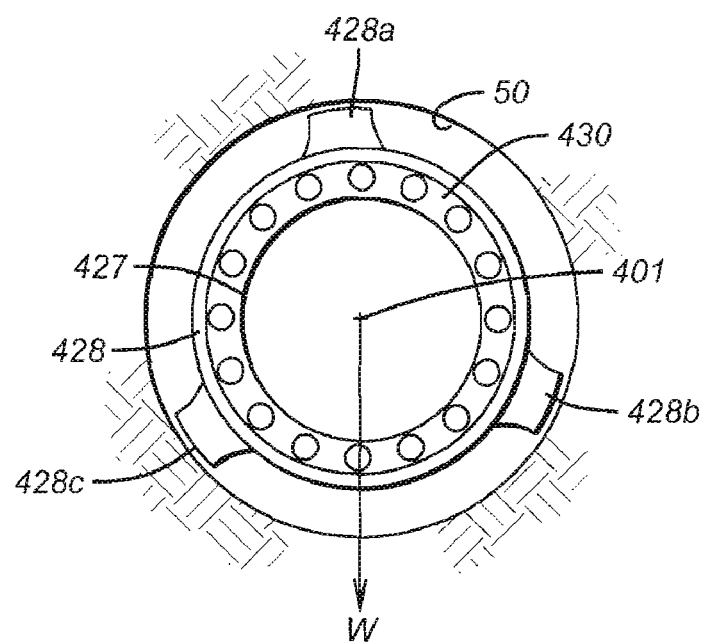
FIG. 4B is a schematic drawing of an end view of a non rotating stabilizer in a borehole according to one embodiment of the present invention.

According to one embodiment of the present invention (see FIGS. 1, 4A, 4B), a non-rotating stabilizer 426 is inserted in the drilling assembly 100 near the NMR sensor 113. As used herein, non-rotating means that the portions of the stabilizers contacting the wall of the borehole do not rotate relative to the borehole. Stabilizer 426 has a sleeve 428 mounted to a body 427 through bearings 430. Sleeve 428 has ribs 428a-c attached thereto for centralizing the drilling assembly in borehole 50. The ribs 428a-c contact the wall of borehole 50 and do not rotate when the drill string 102 rotates the drilling assembly 100 to rotate drill bit 106. As seen in FIG. 4B the drilling assembly weight W, in a deviated wellbore, is supported by the ribs 428b,c. This tends to create a substantial friction that resists rotational motion between the between the ribs and the wall of the borehole. The only torque trying to cause rotation of the non-rotating sleeve 428 is the relatively small frictional torque of the bearings 430. Bearings 430 may be sleeve bearings or alternatively anti-friction rolling element bearings. The bearings may be oil lubricated. Alternatively, the bearings may be mud lubricated. Note that, in any case, the relatively low bearing frictional torque acts at the bearing diameter which is a smaller diameter than the outer rib diameter where the rib-borehole friction is applied. Therefore, the sleeve 428 does not rotate relative to the wall of the borehole while the drill string 102 and the rest of the drilling assembly rotates. The non-rotating sleeve 428 constrains the NMR sensor proximate the stabilizer 426, to rotate substantially concentrically about the axis 401 of the non-rotating sleeve 428, thereby eliminating whirl effects in the NMR sensor measurements. It is also clear from the force diagram of FIG. 5 that the weight of the drilling assembly is transmitted through the ribs to the wall of the borehole 50. There is a horizontal component of this force equal to $W/2 \cos(\theta)$ that is reacted at the wall of the borehole. This horizontal force must be exceeded by any radial vibration force in order to create lateral motion that will affect sensor measurements. Therefore, the non-rotating stabilizer also acts to reduce the radial motion caused by drill string vibration. As seen in FIG. 1, the drilling assembly may also include a second non-rotating stabilizer 127 positioned such that NMR sensor is between two such non-rotating stabilizers. As one skilled in the art will appreciate, such a two-point support arrangement acts to further limit any bending displacement at the sensor location.

Figure 5:
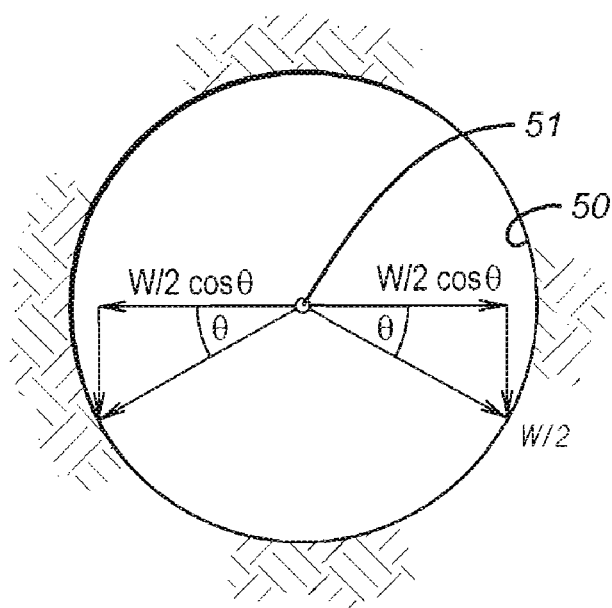
FIG. 5 is a schematic drawing of force diagram showing forces associated with a non-rotating stabilizer in a borehole according to one embodiment of the present invention.
Figure 6:
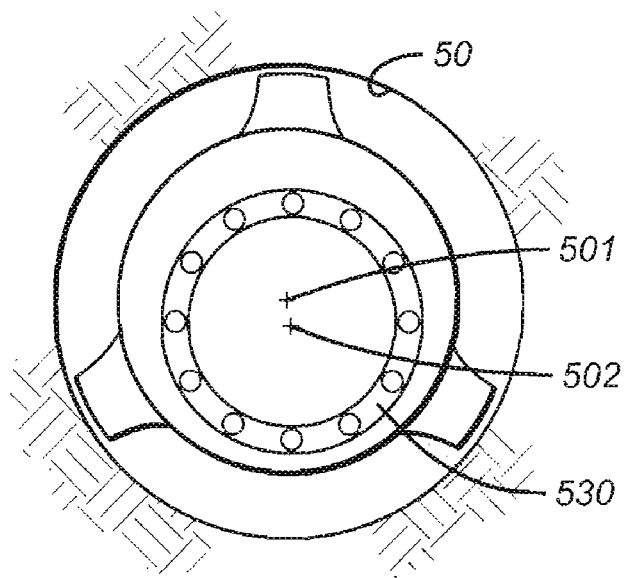
FIG. 6 is a schematic drawing of an eccentric non-rotating stabilizer according to one embodiment of the present invention.

It can be seen from FIG. 5 that the magnitude of the horizontal force increases as $\theta$ decrease since the cosine function approaches one as the $\theta$ approaches zero. In one embodiment, see FIG. 6, the center of rotation of the drilling assembly 100 in the non-rotating stabilizer is eccentrically located below the center 501 of the stabilizer blades. As shown above, this arrangement increases the horizontal forces that will counter act any lateral vibration motion.

Figure 7:
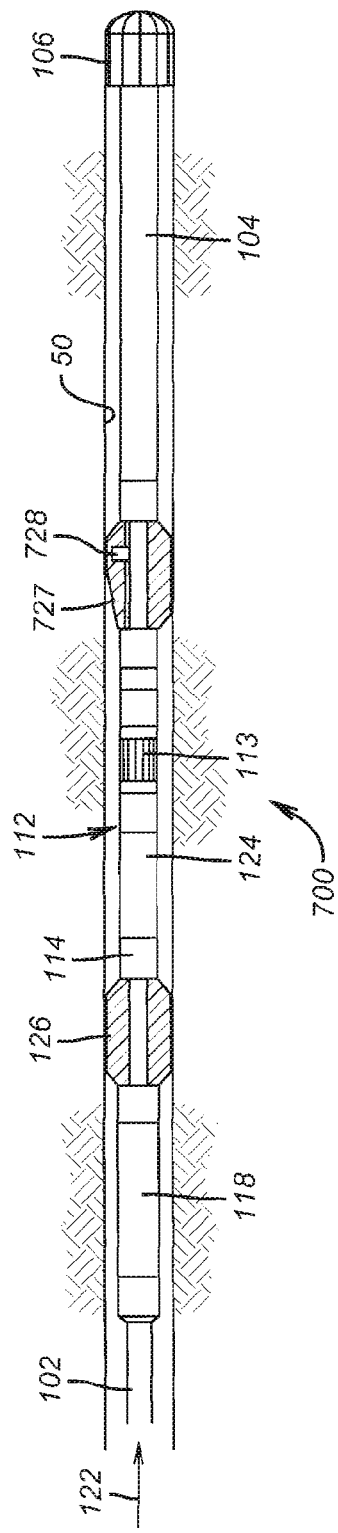
FIG. 7 is a schematic drawing of a drilling assembly having an adjustable non-rotating stabilizer according to one embodiment of the present invention.

In another embodiment, see FIG. 7, an adjustable stabilizer 727 is inserted in drilling assembly 700. Adjustable stabilizer 727 has an adjustable rib 728 that extends to contact the wall of the borehole 50 to substantially eliminate any clearance at that location. Alternatively, adjustable stabilizer 727 may have multiple adjustable ribs 728. The adjustable rib 728 supplies sufficient force to overcome any vibrational motion at that location, thereby further reducing the motion at the sensor location to acceptable levels. The adjustable rib 728 may be powered by a hydraulic system or an electric motor contained in the stabilizer 727. Measurements of radial motion from accelerometers in the stabilizer 727 or the MWD tool 104, for example, may be used by a downhole controller including a processor (not shown) to control the displacement of the adjustable rib 728 to increase the effective diameter of the stabilizer 727 until the motion of the sensor 113 is within acceptable levels. Alternatively, two adjustable stabilizers may be inserted in drilling assembly 100 on either side of sensor 113. Alternatively, the adjustable rib 728 described above may be a pivoted arm (not shown) that is extendable to contact the wall of borehole 50.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

What is claimed is:

1. A system for controlling sensor motion while measuring a parameter of interest in a wellbore formed in an earthen formation, comprising:
   (a) a drilling tubular conveyed into the wellbore and including a drill bit;
   (b) a first sensor positioned at a selected location along the drilling tubular, the first sensor measuring the parameter of interest;
   (c) a stabilizer positioned between the first sensor and the drill bit, the stabilizer being rotatably coupled to the drilling tubular and forming at least one vibrational node at the selected location, the stabilizer including at least one non-adjustable rib that extends radially outward therefrom to reduce motion of the first sensor below a predetermined level.

2. The system of claim 1, wherein the first sensor comprises one of: (i) an NMR sensor, (ii) a density sensor and (iii) a porosity sensor.

3. The system of claim 1, further comprising a second sensor detecting motion of the drilling tubular proximate the first sensor.

4. The system of claim 3, wherein the second sensor is one of: (i) an accelerometer; and (ii) three mutually orthogonal accelerometers.

5. The system of claim 1, wherein the stabilizer comprises:
   (i) a sleeve on which the at least one non-adjustable rib is formed;
   (ii) a housing connected to the drilling tubular and on which the sleeve is mounted; and
   (iii) a bearing acting cooperatively with the sleeve and the housing for allowing relative motion therebetween.

6. The system of claim 5, wherein a center of rotation of the drilling tubular is eccentric to a center of the stabilizer.

7. The system of claim 1, further comprising a second stabilizer having at least one adjustable rib, the adjustable rib being controllably extended to contact a wellbore wall.

8. The system of claim 1, wherein the stabilizer constrains the first sensor to rotate substantially concentrically with an axis of the stabilizer to reduce whirl.

9. A system for controlling sensor motion while measuring a parameter of interest in a wellbore formed in an earthen formation, comprising:
   a drilling tubular conveyed into the wellbore;
   a first sensor positioned at a selected location along the drilling tubular, the first sensor measuring the parameter of interest;
   a stabilizer rotatably coupled to the drilling tubular and forming at least one vibrational node at the selected location, the stabilizer including at least one non-adjustable rib that extends radially outward therefrom to reduce motion of the first sensor below a predetermined level; and a second stabilizer rotatably coupled to the drilling tubular, the stabilizer being deployed on one side of the first sensor and the second stabilizer being deployed on the other side of the first sensor.

10. A method for controlling motion of a sensor during a measurement of a parameter of interest in a wellbore, comprising:
  a. conveying a drilling tubular into the wellbore;
  b. rotatably coupling a stabilizer to the drilling tubular, the stabilizer having one or more non-adjustable ribs;
  c. forming a vibrational node in the drilling tubular using the stabilizer; and
  d. disposing a first sensor at the vibrational node uphole of the stabilizer, the first sensor measuring the parameter of interest.

11. The method of claim 10, wherein the stabilizer forms the vibrational node by reducing motion of the first sensor below a predetermined level.

12. A method of claim 10 further comprising analytically predicting a location of the vibrational node.

13. The method of claim 10, wherein the first sensor comprises one of: (i) an NMR sensor, (ii) a density sensor and (iii) a porosity sensor.

14. The method of claim 10, further comprising detecting motion of the drilling tubular proximate the first sensor using a second sensor disposed in the drilling tubular.

15. The method of claim 14, wherein the second sensor is one of: (i) an accelerometer; and (ii) three mutually orthogonal accelerometers.

16. The method of claim 10, wherein the stabilizer comprises:
  i. a housing attached to the drilling tubular;
  ii. a sleeve substantially surrounding at least a portion of the housing; and
  iii. a bearing acting cooperatively with the sleeve and the housing for allowing relative motion therebetween.

17. The method of claim 10, further comprising displacing the center of the non-rotating stabilizer relative to a longitudinal axis of the drilling tubular such that a center of rotation of the drilling tubular is eccentric to a center of the stabilizer.

18. The method of claim 10 further comprising constraining the first sensor with the stabilizer to rotate substantially concentrically with a longitudinal axis of the stabilizer to reduce whirl.

19. A method for controlling motion of a sensor during a measurement of a parameter of interest in a wellbore, comprising:
  conveying a drilling tubular into the wellbore;
  rotatably coupling a stabilizer to the drilling tubular, the stabilizer having one or more non-adjustable ribs;
  forming a vibrational node in the drilling tubular using the stabilizer; and
  disposing a first sensor at the vibrational node, the first sensor measuring the parameter of interest,
  controlling motion of the drilling tubular using a second stabilizer cooperating with the stabilizer to form the vibrational node, the stabilizer being deployed on one side of the first sensor and the second stabilizer being deployed on the other side of the first sensor.

20. A system for controlling motion of a sensor while measuring a parameter of interest in a wellbore formed in an earthen formation, comprising:
  (a) a drilling tubular conveyed into the wellbore;
  (b) a first sensor disposed at a selected location along the drilling tubular, the first sensor measuring the parameter of interest; and
  (c) a substantially non-rotating stabilizer disposed at the selected location along the drilling tubular, the substantially non-rotating stabilizer having at least one rib and forming a vibrational node by (i) substantially reducing a clearance between the stabilizer and a wellbore wall to reduce radial vibration and (ii) constraining the first sensor to rotate substantially concentrically with an axis of the stabilizer to reduce whirl, the first sensor being positioned proximate the vibrational node to reduce the radial vibration and the whirl of the first sensor below a predetermined level during measurement of the parameter of interest.

* * * * *